(12) United States Patent
Zhu et al.

(10) Patent No.: US 12,012,010 B2
(45) Date of Patent: Jun. 18, 2024

(54) DIRECT-CURRENT CHARGING GUN AND CHARGING PILE

(71) Applicant: NIO TECHNOLOGY (ANHUI) CO., LTD, Hefei (CN)

(72) Inventors: Yue Zhu, Shanghai (CN); Jiamin Ma, Shanghai (CN); Chuangcheng Sun, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 205 days.

(21) Appl. No.: 17/549,158

(22) Filed: Dec. 13, 2021

(65) Prior Publication Data
US 2022/0194237 A1    Jun. 23, 2022

(30) Foreign Application Priority Data

Dec. 18, 2020    (CN) .......................... 202011506534.3

(51) Int. Cl.
*B60L 53/16*    (2019.01)
*B60L 53/30*    (2019.01)
*H01R 13/428*    (2006.01)

(52) U.S. Cl.
CPC ............. *B60L 53/16* (2019.02); *B60L 53/305* (2019.02); *H01R 13/428* (2013.01); *H01R 2201/26* (2013.01)

(58) Field of Classification Search
CPC ........ B60L 53/16; B60L 53/305; B60L 53/11; B60L 53/30; B60L 53/31; B60L 53/60;
(Continued)

(56) References Cited

U.S. PATENT DOCUMENTS

| 5,751,135 A | * | 5/1998 | Fukushima | ........... H02J 7/0045 |
| | | | | 320/107 |
| 2011/0212645 A1 | * | 9/2011 | Osawa | .................... B60L 53/16 |
| | | | | 439/352 |

(Continued)

*Primary Examiner* — Nha T Nguyen
(74) *Attorney, Agent, or Firm* — Sheridan Ross P.C.

(57) ABSTRACT

The invention relates to the field of electric vehicles, and particularly provides a direct-current charging gun and charging pile. The invention aims to solve the problem that a user, when operating a current direct-current charging gun, needs to make round trips back and forth between a charging pile and a charging gun to stop charging, pull out the gun and return the gun, thereby degrading the user experience. For this purpose, the direct-current charging gun of the invention comprises an unlocking mechanism, a safety mechanism and a communication mechanism, wherein the safety mechanism is connected to the communication mechanism and the unlocking mechanism separately; the unlocking mechanism is used for locking when the direct-current charging gun is in use, and for unlocking when the direct-current charging gun is not in use; the communication mechanism is configured to interrupt a direct current in the charging gun when being triggered; and the safety mechanism is configured not to trigger the communication mechanism in an unarmed state and to lock the unlocking mechanism, and triggers the communication mechanism first and then unlocks the unlocking mechanism during arming. It can be avoided that the user makes round trips back and forth between the charging pile and the charging gun, thereby improving the user experience.

7 Claims, 6 Drawing Sheets

(58) Field of Classification Search
CPC ... B60L 53/68; H01R 13/428; H01R 13/6275; H01R 2201/26; H01R 13/707; H01R 13/6397; G07C 9/00174
USPC .......................................................... 320/109
See application file for complete search history.

(56) References Cited

U.S. PATENT DOCUMENTS

| | | | |
|---|---|---|---|
| 2012/0129378 A1* | 5/2012 | Kiko | B60L 53/31 |
| | | | 362/555 |
| 2012/0171900 A1* | 7/2012 | Sebald | H01R 13/5227 |
| | | | 29/874 |
| 2014/0357113 A1* | 12/2014 | Fehler | H01R 13/639 |
| | | | 439/367 |
| 2017/0062984 A1* | 3/2017 | Moseke | H01R 13/6335 |
| 2019/0280498 A1* | 9/2019 | Suzuki | H01M 10/46 |
| 2020/0395713 A1* | 12/2020 | Motomiya | B60L 53/16 |
| 2020/0398684 A1* | 12/2020 | Motomiya | H01R 13/62944 |
| 2020/0398685 A1* | 12/2020 | Motomiya | B60L 53/16 |

* cited by examiner

DIRECT-CURRENT CHARGING GUN AND CHARGING PILE

CROSS-REFERENCE TO RELATED APPLICATION

This application claims the benefit of China Patent Application No. 202011506534.3 filed Dec. 18, 2020, the entire contents of which are incorporated herein by reference in its entirety.

TECHNICAL FIELD

The invention relates to the technical field of charging devices for electric vehicles, and particularly provides a direct-current charging gun and charging pile.

BACKGROUND ART

In recent years, a spurt in growth of electric vehicles have emerged. Compared with traditional fuel vehicles, the electric vehicles are more energy-saving and environmentally friendly. In current various power solutions, household charging piles are the largest in number and are also the most convenient one. With gradual increase of battery capacity, direct-current charging will become the mainstream in the market, and it is imperative for vehicles to cancel alternating-current charging ports and on-board battery charger. Conventional household alternating-current charging piles will also be replaced by low-power direct-current charging piles. Since alternating current has the zero-crossing feature and thus can automatically extinguish an arc, and a button can be pressed to pull a gun during charging, directly stopping charging without causing an accident. However, since direct-current charging needs to be performed under a high voltage condition, it is impossible to simply achieve automatic arc extinguishing, and if the gun is directly pulled out, it is likely to cause an arc discharge phenomenon, causing serious accidents. Therefore, for the direct-current charging pile, charging is usually stopped first before the gun is pulled out.

Common methods for stopping charging of a direct-current charging pile generally include: 1. stopping charging by using a mobile phone APP; 2. operating a pile-end screen to stop charging; 3. swiping a card in a card swiping area at a charging pile end to stop charging; and 4. operating a pile-end stop button to stop charging. Charging stopping with an APP cannot be realized without network, and is very unfriendly for a use scenario of an underground garage; and the other three stopping methods all require a user to make multiple trips between the charging pile and the charging gun for operations, such as a stopping operation and a gun returning operation, leading to very poor user experience.

Accordingly, there is a need in the art for a novel direct-current charging gun and charging pile to solve the problem that a user needs, when operating a current direct-current charging gun, to make round trips back and forth between a charging pile and a charging gun to stop charging, to pull out the gun and to return the gun, thereby degrading the user experience.

SUMMARY OF THE INVENTION

In order to solve the above problem in the prior art, namely, in order to solve the problem that a current direct-current charging gun requires round trips back and forth between a charging pile and the charging gun to stop charging, to pull out the gun and to return the gun, thereby reducing the user experience, the invention provides a direct-current charging gun, comprising an unlocking mechanism, a safety mechanism and a communication mechanism, wherein the safety mechanism is connected to the communication mechanism and the unlocking mechanism separately; the unlocking mechanism is used for locking when the direct-current charging gun is in use, and for unlocking when the direct-current charging gun is not in use; the communication mechanism is configured to be in communication, when being triggered, with a charging device to interrupt a direct current in the charging gun; the safety mechanism is configured not to trigger the communication mechanism in an unarmed state and to lock the unlocking mechanism, and triggers the communication mechanism first and then unlocks the unlocking mechanism during arming.

In a preferred technical solution of the above-mentioned direct-current charging gun, when the safety mechanism is in a default state position, the communication mechanism is not triggered, and the unlocking mechanism is in a locked state; when the safety mechanism leaves the default state position, the communication mechanism is triggered; and when the safety mechanism is moved to a first state position, the unlocking mechanism is unlocked and can be operated to achieve unlocking.

In a preferred technical solution of the above-mentioned direct-current charging gun, the unlocking mechanism is a lever assembly. The lever assembly comprises an unlocking lever and a first lever rotating shaft, wherein the first lever rotating shaft is disposed at a middle portion of the unlocking lever, and a snap-fit fastener is disposed on one side of the unlocking lever; the safety mechanism comprises a pressing rod and a reset assembly, wherein the upper end of the pressing rod is slidably sleeved on the side of the unlocking lever away from the snap-fit fastener, and the reset assembly comprises a reset lever, a second lever rotating shaft and a stop member, the second lever rotating shaft being disposed at a middle portion of the reset lever, the lower end of the pressing rod abutting against one end of the reset lever, and the stop member being fixedly disposed and abutting against the end of the reset lever away from the pressing rod; and the communication mechanism comprises a first signal contact and a second signal contact, wherein the first signal contact is fixedly disposed on the pressing rod, the second signal contact is in communicative connection with the charging device, and the first signal contact and the second signal contact are not triggered when abutting and are triggered when being separated.

In a preferred technical solution of the above-mentioned direct-current charging gun, the lever assembly further comprises a first elastic member, wherein one end of the first elastic member is fixedly disposed, and the other end of the first elastic member is connected to the unlocking lever and is disposed between the first lever rotating shaft and the pressing rod; and/or the reset assembly further comprises a second elastic member, wherein one end of the second elastic member is fixedly disposed in a sliding direction of the pressing rod, and the other end of the second elastic member is connected to the pressing rod.

In a preferred technical solution of the above-mentioned direct-current charging gun, the reset assembly further comprises third elastic members, wherein one end of each of the two third elastic members is fixedly disposed, the other end of each of the two third elastic members is connected to the reset lever, and the second lever rotating shaft is disposed between the two third elastic members.

In a preferred technical solution of the above-mentioned direct-current charging gun, the reset lever is provided with a bearing member, and the bearing member is disposed on the side close to the pressing rod, and/or the reset lever is provided with a friction patch, and/or the reset lever is provided with an arc-shaped groove, and the lower end of the pressing rod is provided with an arc-shaped protrusion mating with the arc-shaped groove.

In a preferred technical solution of the above-mentioned direct-current charging gun, the unlocking mechanism is a lever assembly. The lever assembly comprises an unlocking lever and a first lever rotating shaft, wherein the first lever rotating shaft is disposed at a middle portion of the unlocking lever, and a snap-fit fastener is disposed on one side of the unlocking lever; the safety mechanism comprises a pressing rod and a reset assembly, wherein the upper end of the pressing rod is slidably sleeved on the side of the unlocking lever away from the snap-fit fastener; the reset assembly comprises an L-shaped fixing block and a fourth elastic member, wherein the L-shaped fixing block comprises a vertical raised edge and a horizontal raised edge, the fourth elastic member being disposed on the horizontal raised edge, and the lower end of said pressing rod abutting against the top of the vertical raised edge; and the communication mechanism comprises a first signal contact and a second signal contact, wherein the first signal contact is fixedly disposed on the pressing rod, the second signal contact is in communicative connection with the charging device, and the first signal contact and the second signal contact are not triggered when abutting and are triggered when being separated.

In a preferred technical solution of the above-mentioned direct-current charging gun, the unlocking mechanism comprises a sleeve and an unlocking mechanism body, wherein one end of the unlocking mechanism body is provided with two retractable elastic snap-fit fasteners that splay outward, and the sleeve is slidably disposed on the other end of the unlocking mechanism body; the safety mechanism comprises a pressing bar and a limiting member, wherein the pressing bar is provided with a hollow columnar boss, the limiting member is provided with a limiting channel therein, and two ends of the hollow columnar boss abut against the limiting channel; and the communication mechanism comprises a first signal contact and a second signal contact, wherein the first signal contact is fixedly disposed on the pressing bar, the second signal contact is in communicative connection with the charging device, and the first signal contact and the second signal contact are not triggered when abutting and are triggered when being separated.

In a preferred technical solution of the above-mentioned direct-current charging gun, the direction of movement of the safety mechanism for arming is different from the direction of movement of the unlocking mechanism for unlocking.

The invention further provides a charging pile, comprising the direct-current charging gun in any one of the above technical solutions.

It can be understood by those skilled in the art that in the technical solutions of the invention, the direct-current charging gun comprises an unlocking mechanism, a safety mechanism and a communication mechanism, wherein the safety mechanism is connected to the communication mechanism and the unlocking mechanism separately; the unlocking mechanism is used for locking when the direct-current charging gun is in use, and for unlocking when the direct-current charging gun is not in use; the communication mechanism is configured to be in communication, when being triggered, with a charging device to interrupt a direct current in the charging gun; the safety mechanism is configured not to trigger the communication mechanism in an unarmed state and to lock the unlocking mechanism, and triggers the communication mechanism first and then unlocks the unlocking mechanism during arming; and the charging device may be a charging pile or a charging station, etc., which can charge a piece of equipment to be charged by using a direct-current charging gun.

In the above-mentioned configuration, the communication mechanism is first triggered during the arming of the safety mechanism to change a signal state of the communication mechanism, the charging device stops charging after detecting the signal state change, the safety mechanism is switched to an armed state after the charging operation is stopped, and then the unlocking mechanism is unlocked. Therefore, during charging, the unlocking mechanism is always in a locked state, thereby avoiding the phenomenon that the charging gun is pulled down during charging, and before the gun is pulled, it is inevitable to first trigger the communication mechanism to power off and then to achieve unlocking, so that the operational security of a user can be ensured; in addition, a signal transmission mechanism for stopping charging of the invention is disposed on the direct-current charging gun, avoiding the user from going back and forth between the charging gun and the charging pile, which improves the operational convenience and is beneficial to improving user experience.

BRIEF DESCRIPTION OF THE DRAWINGS

The direct-current charging gun of the invention will be described below with reference to the accompanying drawings. In the drawings.

LIST OF REFERENCE NUMERALS

Figure 1:
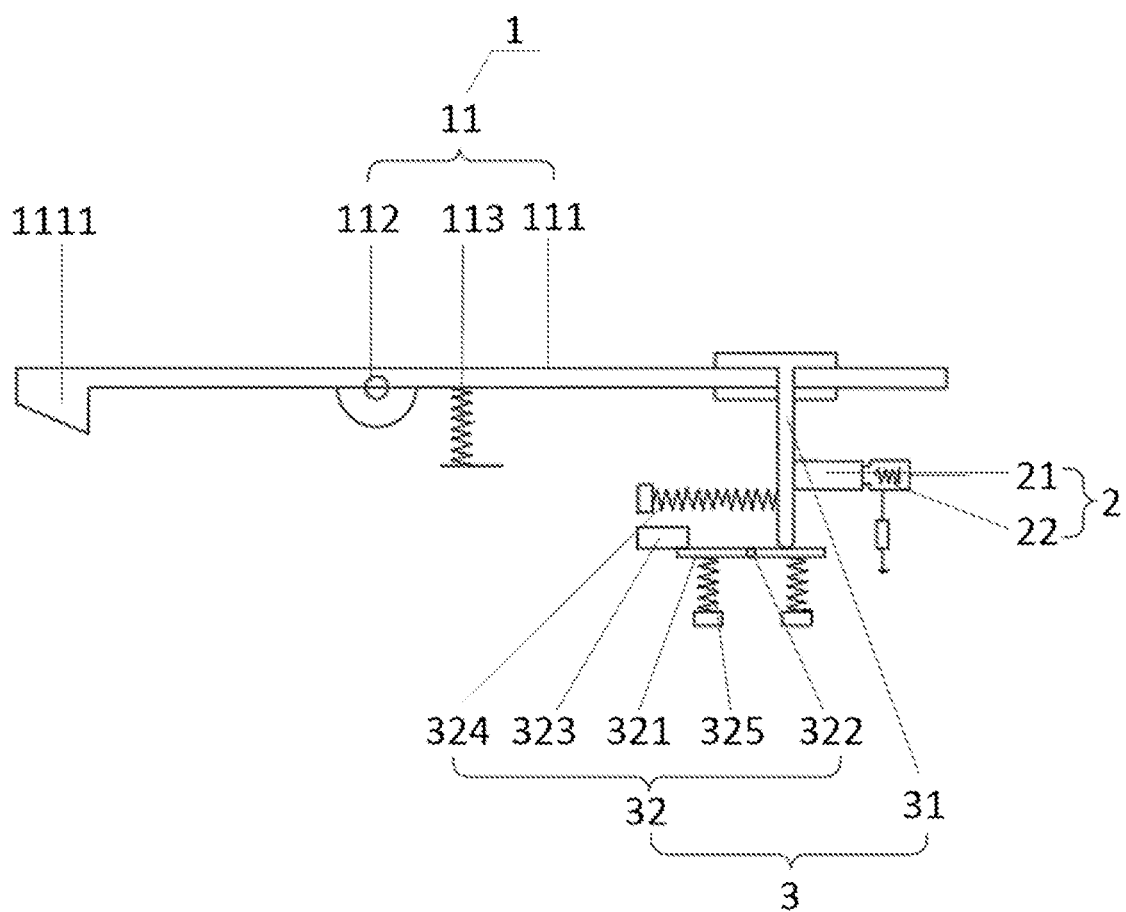
FIG. 1 is a schematic structural diagram of a first embodiment of the direct-current charging gun of the invention.

1—Unlocking mechanism; 11—Lever assembly; 111—Unlocking lever; 1111—Snap—fit fastener; 112—First lever rotating shaft; 113—First elastic member; 12—Sleeve; 13—Unlocking mechanism body; 131—Elastic snap—fit fastener; 2—Communication mechanism; 21—First signal contact; 22—Second signal contact; 23—Boss; 24—Signal switch; 3—Safety mechanisms; 31—Pressing rod; 32—Reset assembly; 321—Reset lever; 322—Second lever rotating shaft; 323—Stop member; 324—Second elastic member; 325—Third elastic member; 326—L—shaped fixing block; 3261—Vertical raised edge; 3262—Horizontal raised edge;

327—Fourth elastic member; 33—Pressing bar; 331—Hollow columnar boss; 34—Limiting member; and 341—Limiting channel.

DETAILED DESCRIPTION OF EMBODIMENTS

Preferred embodiments of the invention are described below with reference to the accompanying drawings. It should be understood by those skilled in the art that these embodiments are only for explaining the technical principles of the invention and are not intended to limit the scope of protection of the invention. Those skilled in the art can make amendments according to requirements so as to adapt to specific application scenarios. For example, although the description is made in terms of a snap-fit fastener, it will be apparent that the invention may take various other forms, such as a magnetic head, provided that it enables unlocking of a charging gun when an unlocking lever is lifted.

It should be noted that in the description of the invention, the terms, such as "center", "upper", "lower", "left", "right", "vertical", "horizontal", "inner" and "outer", that indicate directions or positional relationships are based on the directions or positional relationships shown in the drawings only for convenience of description, and do not indicate or imply that the device or element must have a specific orientation, be constructed and operated in a specific orientation, and therefore cannot be understood as limitation to the invention. In addition, the terms "first", "second" and "third" are for descriptive purposes only and should not be construed as indicating or implying relative importance.

In addition, it should also be noted that, in the description of the invention, the terms "mount", "engage" and "connect" should be interpreted in a broad sense unless explicitly defined and limited otherwise, which, for example, may mean a fixed connection, a detachable connection or an integral connection; may mean a mechanical connection or an electrical connection; and may mean a direct connection, an indirect connection by means of an intermediary, or internal communication between two elements. For those skilled in the art, the specific meaning of the above-mentioned terms in the invention can be interpreted according to the specific situation.

As shown in FIGS. 1, 3, 4 and 5, in order to solve the problem that a current direct-current charging gun requires round trips back and forth between a charging pile and the charging gun to stop charging, to pull out the gun and to return the gun, thereby reducing the user experience, a direct-current charging gun of the invention comprises an unlocking mechanism 1, a safety mechanism 3 and a communication mechanism 2, wherein the safety mechanism 3 is connected to the communication mechanism 2 and the unlocking mechanism 1 separately; the unlocking mechanism 1 is used for locking when the direct-current charging gun is in use, and for unlocking when the direct-current charging gun is not in use; the communication mechanism 2 is configured to be in communication, when being triggered, with a charging device to interrupt a direct current in the charging gun; and the safety mechanism 3 is configured not to trigger the communication mechanism 2 in an unarmed state and to lock the unlocking mechanism 1, and triggers the communication mechanism 2 first and then unlocks the unlocking mechanism 1 during arming.

According to the above-mentioned configuration, the safety mechanism 3 first locks the unlocking mechanism 1, the communication mechanism 2 is then triggered during arming to change a signal state of the communication mechanism 2, a charging device stops charging after detecting the signal state change, and when the charging gun is in a state of charging stop, the safety mechanism 3 can unlock the unlocking mechanism 1. The above-mentioned configuration avoids the phenomenon that a user directly pulls out the gun during the charging, thereby ensuring the operational safety of the user; in addition, a signal transmission mechanism for stopping charging of the invention is disposed on the direct-current charging gun, avoiding the user from going back and forth between the charging gun and the charging pile, which improves the operational convenience and is beneficial to improving user experience.

As an embodiment, when the safety mechanism 3 is in a default state position, the communication mechanism 2 is not triggered, and the unlocking mechanism 1 is in a locked state; when the safety mechanism 3 leaves the default state position, the communication mechanism 2 is triggered; and when the safety mechanism 3 is moved to a first state position, the unlocking mechanism 1 is unlocked, and the unlocking mechanism 1 can be operated to achieve unlocking. In this configuration, the functions of power-off and unlocking of the direct-current charging gun can be achieved merely by moving the safety mechanism 3 between the positions, and the operation is simple, avoiding the inconvenience caused by the user operating a charging stop button at a pile side and a vehicle side.

With continuing reference to FIG. 1, a specific solution of a first embodiment of the invention is described. In this embodiment, the unlocking mechanism 1 is a lever assembly 11, and the lever assembly 11 comprises an unlocking lever 111 and a first lever rotating shaft 112, wherein the first lever rotating shaft 112 is disposed at a middle portion of the unlocking lever 111, the unlocking lever 111 can rotate about the first lever rotating shaft 112, and one side of the unlocking lever 111 is provided with a snap-fit fastener 1111; the safety mechanism 3 comprises a pressing rod 31 and a reset assembly 32, wherein the upper end of the pressing rod 31 is slidably sleeved on the side of the unlocking lever 111 away from the snap-fit fastener 1111, and the reset assembly 32 comprises a reset lever 321, a second lever rotating shaft 322 and a stop member 323, the second lever rotating shaft 322 being disposed at a middle portion of the reset lever 321, the lower end of the pressing rod 31 abutting against one end of the reset lever 321, the stop member 323 being fixedly disposed, and the stop member 323 abutting against the end of the reset lever 321 away from the pressing rod 31; and the communication mechanism 2 comprises a first signal contact 21 and a second signal contact 22, wherein the first signal contact 21 is fixedly disposed on the pressing rod 31, and the second signal contact 22 is in communication connection with the charging device, and the first signal contact 21 and the second signal contact 22 are not triggered when abutting and are triggered when being separated, and it can be understood that the communication connection may be communication connection via a signal line in a wired form or via a Wi-Fi mode in a wireless form.

The charging process of the first embodiment described above is that firstly, the pressing rod 31 is operated to slide towards the left of FIG. 1, when the pressing rod 31 leaves the default state position as shown in FIG. 1, the first signal contact 21 and the second signal contact 22 are separated, and the signal state change of the communication mechanism 2 is triggered, the charging device immediately stops charging and reduces the voltage to a safe voltage after collecting the signal state change, and at this moment, the pressing rod 31 continues to slide until the pressing rod 31 slides to the other side over the second lever rotating shaft 322; in this case, the pressing rod 31 is in the first state position, at this time, the output voltage of the charging device has decreased below the safe voltage, and there is no safety risk for gun pulling. In the first state position, the pressing rod 31 may be pressed in a pressing direction, the unlocking mechanism 1 is in a free state, and at this time, the pressing rod 31 continues to be pressed downward; according to the lever principle, the snap-fit fastener 1111 on the unlocking lever 111 is lifted, and the charging gun is unlocked. As another embodiment, the snap-fit fastener 1111 on the unlocking lever 111 may be replaced with a magnetic head, etc. and of course, the charging seat is provided with the other magnetic head attracting the magnetic head on the unlocking lever 111 thereon, provided that the locking and unlocking of the unlocking lever 111 can be achieved.

The above configuration has the following advantages: due to the function of the stop member 323, the pressing rod 31 is restricted, in the default state position in FIG. 1, from pressing down the reset lever 321, namely, the pressing rod 31 first needs to be moved to the first state position, the downward pressing operation follows, and then unlocking and gun pulling are performed, increasing the time from triggering the communication mechanism 2 to the gun pulling. Thus, a function of delaying the gun pulling is provided, avoiding arc discharge and other safety accidents.

Furthermore, after the charging device is powered off, the pressing rod 31 on the direct-current charging gun can be directly operated for unlocking, namely, a signal transmission structure for controlling the charging gun to stop the charging operation is disposed on the charging gun, avoiding the inconvenience caused by the user operating the charging stop button on the pile side and the vehicle side, and the phenomenon that a terminal cannot stop the charging operation due to no signal when operation is performed using terminal software.

Moreover, the invention uses a mechanical lock, reducing the failure rate of the charging gun, avoiding the abnormal phenomenon that the charging gun cannot be locked or unlocked, improving the reliability of the charging gun, decreasing the number of control and feedback lines of the charging gun, decreasing the wire diameter of a wiring harness of the charging gun, and improving user experience.

Besides, the locking and unlocking operation using the snap-fit fastener 1111 is very simple, generally requires only a snap-fitting action to achieve quick installation, and further has the advantage of low cost, thereby reducing production and use costs.

As a preferred embodiment, the lever assembly 11 further comprises a first elastic member 113, wherein one end of the first elastic member 113 is fixedly disposed, and the other end of the first elastic member 113 is connected to the unlocking lever 111 and disposed between the first lever rotating shaft 112 and the pressing rod 31.

Due to provision of the first elastic member 113, the unlocking lever 111 can be to lift the pressing side of the unlocking lever 111 without an external force, and an effective supporting role can be played on the pressing side, thus ensuring that the snap-fit fastener 1111 and the vehicle side forms an effective locking relationship.

As a preferred embodiment, the reset assembly 32 further comprises a second elastic member 324, wherein one end of the second elastic member 324 is fixedly disposed in a sliding direction of the pressing rod 31, and the other end of the second elastic member 324 is connected to the pressing rod 31.

Due to provision of the second elastic member 324, an operation damping in the sliding direction of the pressing rod 31 (in the direction from the default state position to the first state position) is provided, thus the time from triggering the communication mechanism 2 to unlocking the unlocking mechanism 1 is further prolonged, and the role of delaying unlocking is played. The delay time is greater than 1 second (a typical value), preventing charged gun pulling and avoiding arc discharge and other safety accidents. In addition, after the pressing rod 31 is released, the pressing rod 31 can be returned to the default state position under the action of the second elastic member 324, such that the push rod 31 is in contact with the communication mechanism 2, and the charging device is in a state where charging can be started, thereby achieving circulation of the whole operation process; and as another embodiment, the reset lever 321 may be provided with a patch material having a large frictional force thereon, or the reset lever 321 itself is made of a material having a large frictional force or is provided with a plurality of arc-shaped grooves, in which case the end of the pressing rod 31 abutting against the reset lever 321 is an arc-shaped protrusion mating with the arc-shaped groove to further achieve the effect of prolonging the time for the pressing rod 31 to reach the first state position.

As a preferred embodiment, the reset assembly 32 further comprises a third elastic member 325, wherein one end of each of the two third elastic members 325 is fixedly disposed, the other end of each of the two third elastic members 325 is connected to the reset lever 321, and the second lever rotating shaft 322 is disposed between the two third elastic members 325.

The above configuration has the following advantages: the third elastic member 325 is configured to be elastically deformed when being subjected to an external force, to be restored to its original shape after the external force is released, and to reset the pressing lever 31 to the default state position under the combined action of the second elastic member 324, wherein the third elastic members 325 are separately disposed on two sides of the reset lever 321, which is beneficial to maintaining the stability of the reset lever 321 during movement of the pressing lever 31.

As another preferable embodiment, the reset lever 321 is provided with a bearing member, wherein the bearing member is disposed on the side close to the pressing rod 31.

Since the bearing member is disposed on the side close to the pressing rod 31, when the reset lever 321 is not subject to other external forces, the pressing rod 31 of the reset lever 321 is inclined around the second lever rotating shaft 322 in the pressing direction because of the gravity on the side close to the pressing rod 31 being greater than the gravity on the side away from the pressing rod 31, and the other end is lifted. At this time, due to provision of the stop member 323, the pressing rod 31 can be prevented from being pressed downward in the default state position, and the pressing rod 31 can be pressed downward in the first state position. In addition, when the external force is released, due to the action of the gravity, the pressing rod 31 can be returned to the first state position, and under the combined action of the second elastic member 324, the pressing rod 31 can be reset to the default state position.

Figure 2:
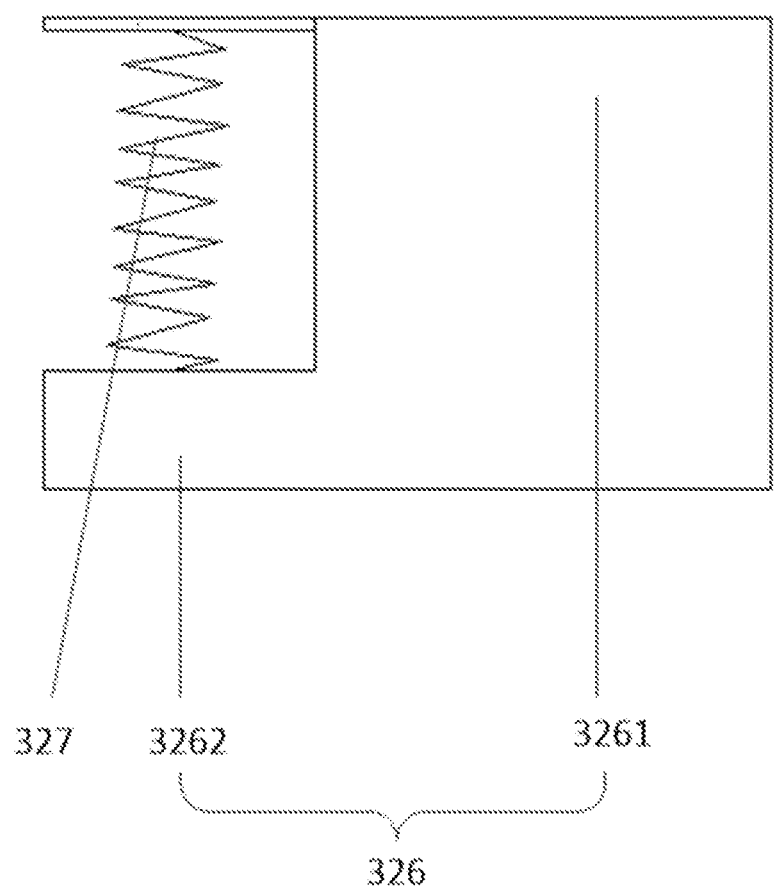
FIG. 2 is a schematic diagram of an embodiment of a reset assembly in the first embodiment of the direct-current charging gun of the invention.

A modified embodiment will be described below with reference to the previous embodiment, as shown in FIG. 2, and with continuing reference to FIG. 1, as another preferred embodiment, the unlocking mechanism 1 is a lever assembly 11, wherein the lever assembly 11 comprises an unlocking lever 111 and a first lever rotating shaft 112, the first lever rotating shaft 112 being disposed in the middle portion of the unlocking lever 111, and a snap-fit fastener 1111 being disposed on one side of the unlocking lever 111; the safety mechanism 3 comprises a pressing rod 31 and a reset assembly 32, wherein the upper end of the pressing rod 31 is slidably sleeved on the side of the unlocking lever 111 away from the snap-fit fastener 1111. The difference from the first embodiment lies in that the reset assembly 32 comprises an L-shaped fixing block 326 and a fourth elastic member 327, wherein the L-shaped fixing block 326 comprises a vertical raised edge 3261 and a horizontal raised edge 3262, the fourth elastic member 327 being disposed on the horizontal raised edge 3262, and the lower end of the pressing rod 31 abutting against the top of the vertical raised edge 3261; and the communication mechanism 2 comprises a first signal contact 21 and a second signal contact 22, wherein the first signal contact 21 is fixedly disposed on the pressing rod 31, the second signal contact 22 is in communicative connection with the charging device, and the first signal contact 21 and the second signal contact 22 are not triggered when abutting and are triggered when being separated.

In the default state position, the lower end of the pressing rod 31 abuts against the top of the vertical raised edge 3261, and since the L-shaped fixing block 326 is non-elastic, the pressing rod 31 cannot be pressed downward during movement along the vertical raised edge 3261 until the pressing rod slides to the fourth elastic member 327, and at this time, the pressing rod 31 is in the first state position, and the fourth elastic member 327 can be compressed to unlock the charging gun and is reset when the external force is released, wherein the length of the vertical raised edge 3261 can be set according to actual situations to achieve the effect of appropriately delaying the time for gun pulling.

Figure 3:
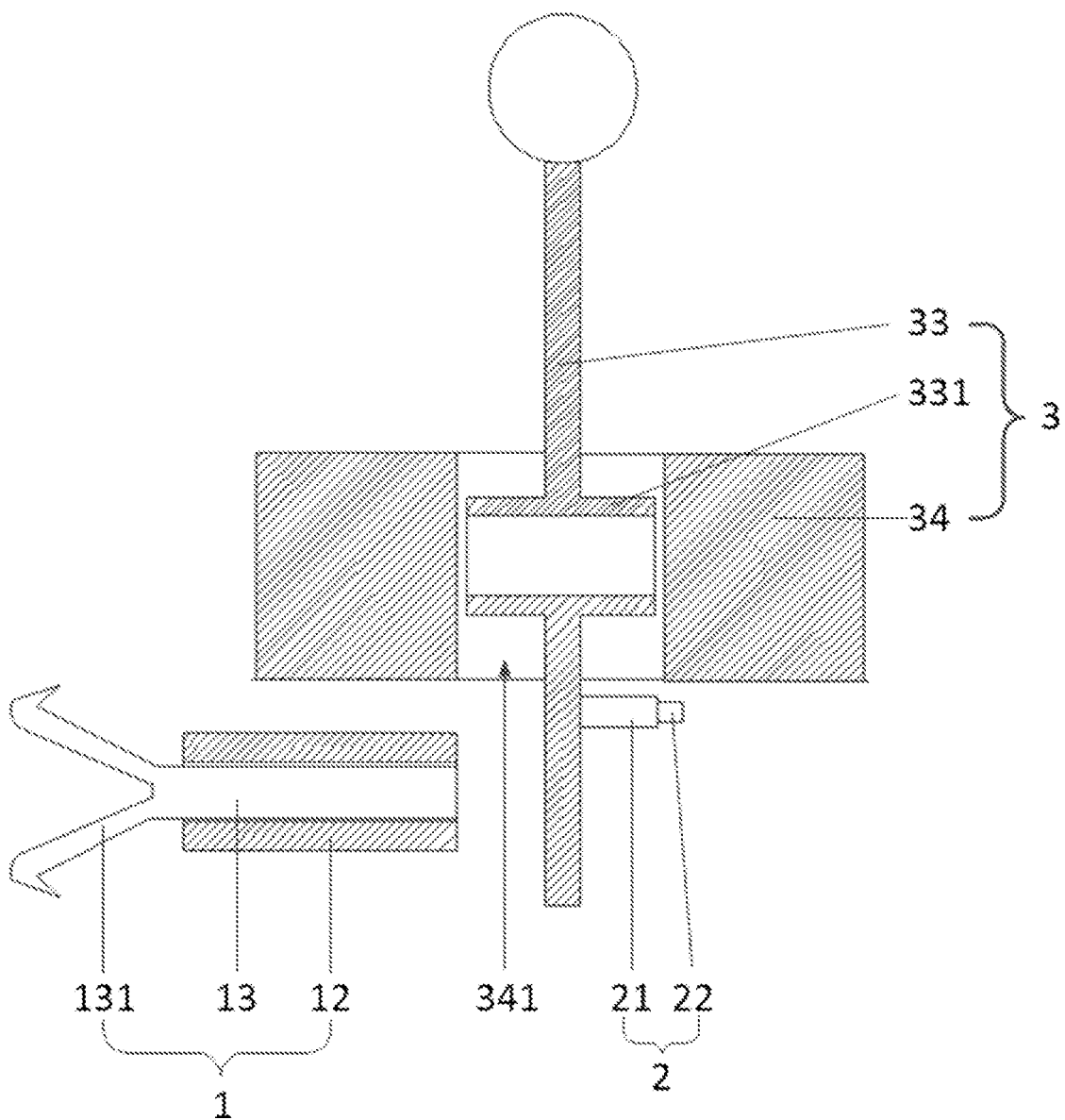
FIG. 3 is a schematic structural diagram of a second embodiment of the direct-current charging gun of the invention in a default state position.
Figure 4:
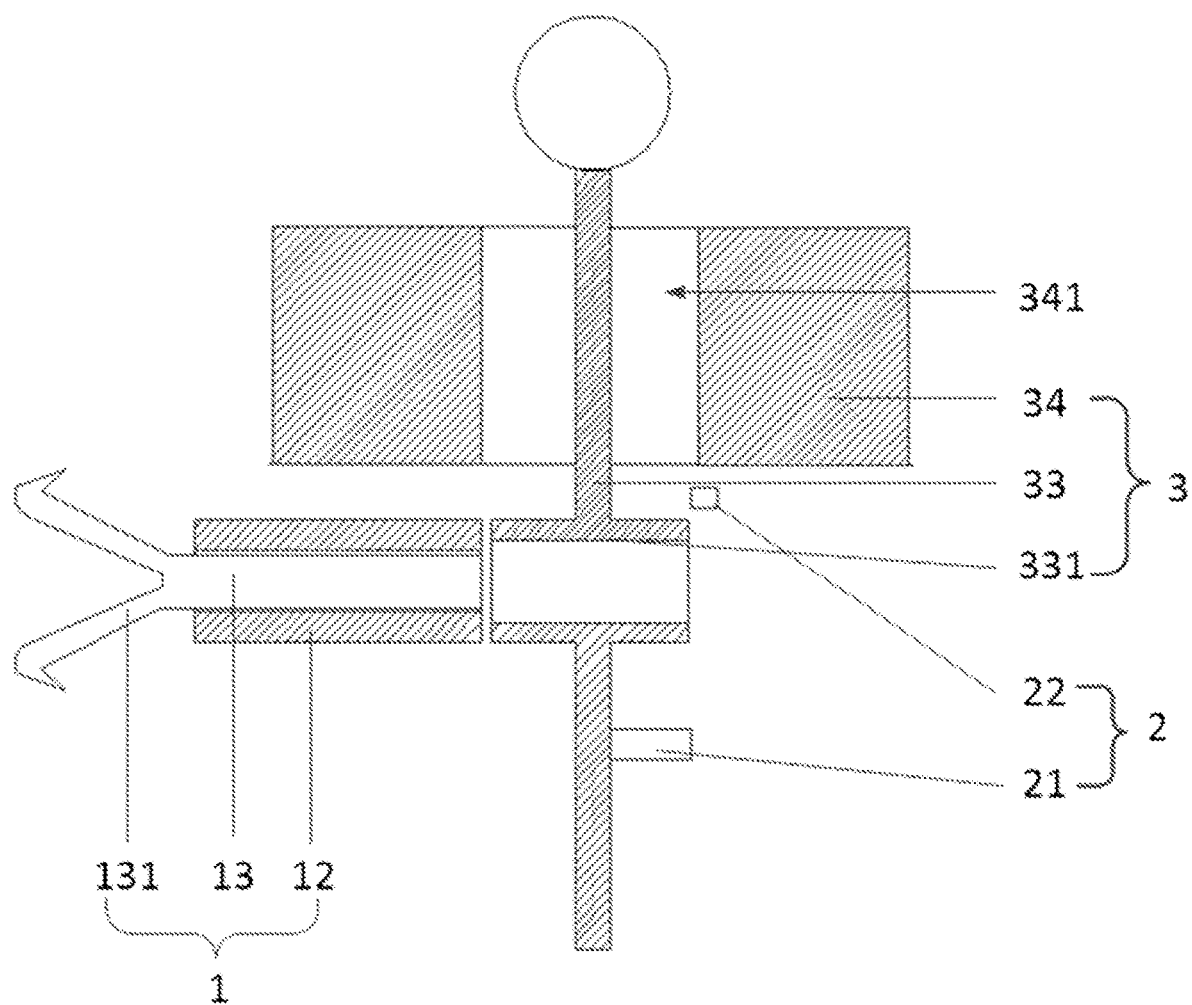
FIG. 4 is a schematic structural diagram of the second embodiment of the direct-current charging gun of the invention in which a hollow columnar boss leaves from a limiting channel.
Figure 5:
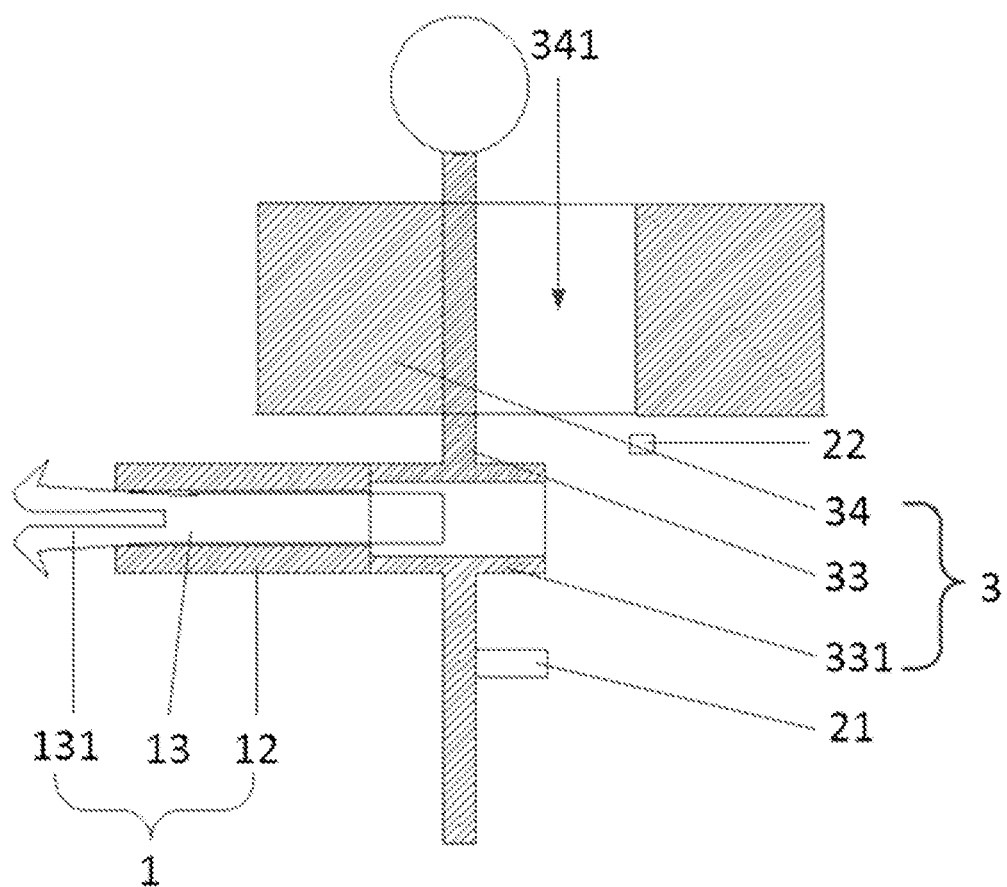
FIG. 5 is a schematic structural diagram of unlocking an unlocking mechanism in the second embodiment of the direct-current charging gun of the invention.

With continuing reference to FIGS. 3 to 5, a second embodiment of the invention is described. In this embodiment, the unlocking mechanism 1 comprises a sleeve 12 and an unlocking mechanism body 13, wherein one end of the unlocking mechanism body 13 is provided with two retractable elastic snap-fit fasteners 131 that splay outward, and the sleeve 12 is slidably disposed on the other end of the unlocking mechanism body 13; the safety mechanism 3 comprises a pressing bar 33 and a limiting member 34, wherein the pressing bar 33 is provided with a hollow columnar boss 331, the limiting member 34 is provided with a limiting channel 341 therein, and two ends of the hollow columnar boss 331 abut against the limiting channel 341; and the communication mechanism 2 comprises a first signal contact 21 and a second signal contact 22, wherein the first signal contact 21 is fixedly disposed on the pressing bar 33, the second signal contact 22 is in communication connection with the charging device, and the first signal contact 21 and the second signal contact 22 are not triggered when abutting and are triggered when being separated.

The limiting channel 341 defines that the hollow columnar boss 331 on the pressing bar 33 only moves in the pressing direction in the limiting channel 341; as shown in FIG. 3, in the default state position, the first signal contact 21 and the second signal contact 22 abut against each other, the hollow columnar boss 331 is in the limiting channel 341, and the elastic snap-fit fasteners 131 splay outward; when the pressing bar 33 is pressed downward, the pressing bar 33 leaves the default state position, the first signal contact 21 and the second signal contact 22 are separated, the second signal contact 22 is in communicative connection with the charging device, and the charging device stops power supply after detecting a signal state change. As shown in FIG. 4, the pressing bar 33 continues to be pressed until the hollow columnar boss 331 leaves the limiting channel 341, at this moment, the pressing bar 33 is in the first state position, the voltage output by the charging device is a safe voltage, and the sleeve 12 can be pushed by using the hollow columnar boss 331 to move towards the elastic snap-fit fasteners 131. As shown in FIG. 5, at this moment, the pressing bar 33 is operated to move towards the unlocking mechanism 1, and the hollow columnar boss 331 abuts against the sleeve 12 and pushes the sleeve 12 to continue to move towards the elastic snap-fit fasteners 131 until the two retractable snap-fit fasteners 131 splaying outward are merged, thereby unlocking the charging gun, wherein the time for gun pulling can be delayed according to the length of the limiting channel 341, which can avoid untimely unlocking of the unlocking mechanism 1, thus avoiding a safety accident.

The first elastic member 113, the second elastic member 324, the third elastic member 325 and the fourth elastic member 327 are preferably springs, but may be elastic pieces, elastic rubber, etc.

In a possible embodiment, the direction of arming movement of the safety mechanism 3 is different from the direction of unlocking movement of the unlocking mechanism 1.

When the direction of arming movement of the safety mechanism 3 is the same as the direction of unlocking movement of the unlocking mechanism 1, if the external force exerted on the safety mechanism 3 is too large, the communication mechanism 2 is instantly unlocked after being triggered, thereby possibly causing gun pulling with arc discharge, and thus causing a safety accident; however, with regard to the configuration of the invention, namely setting of two different directions, even if the external force received is too large, the force only acts in one direction, playing a certain delay effect, and even if the external forces in the two directions are both large, the change of direction will also bring a time interval, thereby effectively playing a safety protection role on the charging gun.

Figure 6:
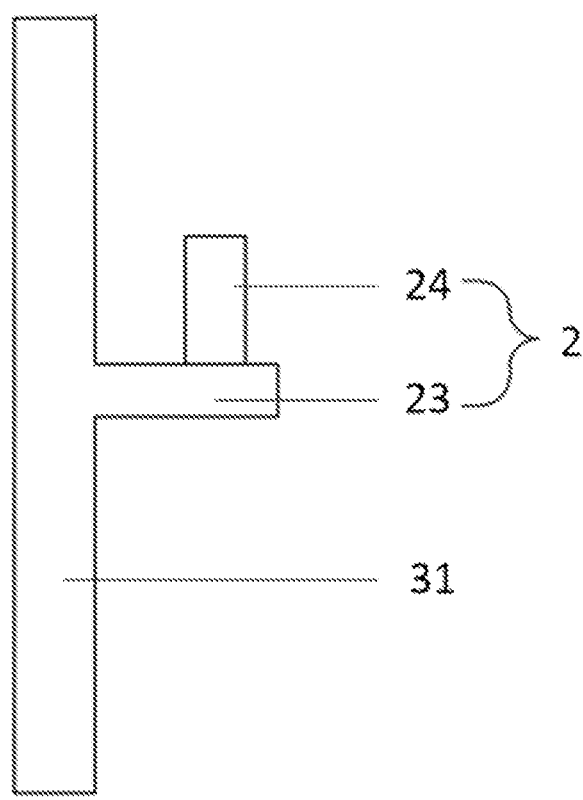
FIG. 6 is a schematic structural diagram of an embodiment of a communication mechanism of the direct-current charging gun of the invention.

In particular, as shown in FIG. 6, as another embodiment, the communication mechanism 2 may comprise a signal switch 24, a boss 23 abutting against the signal switch 24 is disposed on a pressing rod 31, and different working states of the pressing rod 31 are converted into high and low level signals by opening and closing the signal switch 24, which are transmitted to the charging device, wherein when the boss 23 is separated from the signal switch 24, a state change of the signal switch 24 is triggered, and the high and low level signals of the signal switch 24 are then transmitted to a charging device control system that controls the charging pile to stop charging and maintains a charging state when in the default state position; when leaving the default working position, the charging device stops charging, for example, the charging device starts to stop charging immediately after acquiring a signal state change, and after 500 ms (a typical value), and the voltage decreases to a safe voltage below 64 V, thereby ensuring that there is no risk for gun pulling; as an embodiment, the communication mechanism 2 further comprises a signal line for transmitting a signal, wherein the signal switch 24 may also share the same wire with a CC1 signal, in this case, after the signal switch 24 of the communication mechanism 2 is triggered, the CC1 signal is disconnected or the S switch is opened, and the charging pile stops charging immediately after detecting a CC1 signal change; and alternatively, a CC3 signal line is newly added, and when the signal switch 24 of the communication mechanism 2 is triggered, the state of a sensor corresponding to the CC3 signal changes, and the charging pile detects that the state of the CC3 signal line changes and stops charging immediately.

In summary, the direct-current charging gun of the invention can enable the user to directly operate the direct-current charging gun to stop charging, reduce the complexity of using the direct-current charging pile, and improve the convenience of user operation; unlocking and charging form an interlocking mechanism, avoiding the safety risk caused by charged pulling or insertion of the charging gun; an electronic lock is omitted, reducing faults and risk points caused by the electronic lock, and improving product reliability; a wiring harnesses related to electronic lock control is omitted, reducing the number of wiring harnesses, reducing the diameter and weight of a cable, and improving operating experience; and the charging experience of a household direct-current charging pile is improved.

It should be noted that the embodiments described above are merely illustrative of the principle of the invention, not intended for limiting the scope of the invention, and that those skilled in the art will be able to adjust the above structures without departing from the principle of the invention, so as to apply the invention to a specific application scenario.

For example, in an alternative embodiment, only one third elastic member 325 may be disposed, provided that the reset lever 321 can be reset, which does not depart from the principle of the invention and thus falls within the scope of the invention.

For example, in an alternative embodiment, the reset lever 321 may be disposed as a member with a gravity closer to the pressing rod 31 side greater than a gravity away from the pressing rod 31 side, such as, a triangular member, the reset lever 321 can be reset after being pressed as long as it is in the first state position, which does not depart from the principle of the invention and thus falls within the scope of the invention.

For example, in another alternative embodiment, the direction of arming movement of the safety mechanism 3 may be the same as the direction of unlocking movement of the unlocking mechanism 1, provided that the unlocking mechanism 1 is unlocked after the communication mechanism 2 is triggered first, which does not depart from the principle of the invention and thus falls within the scope of the invention.

Furthermore, the invention further provides a charging pile having the direct-current charging gun described in any one of the above embodiments.

Heretofore, the technical solutions of the invention have been described in conjunction with the preferred embodiments shown in the drawings, however, those skilled in the art can readily understand that the scope of protection of the invention is obviously not limited to these specific embodiments. Those skilled in the art could make equivalent changes or substitutions to the related technical features without departing from the principles of the invention, and all the technical solutions after the changes or the substitutions fall within the scope of protection of the invention.

The invention claimed is:

1. A direct-current charging gun, comprising an unlocking mechanism, a safety mechanism and a communication mechanism, the safety mechanism being connected to the communication mechanism and the unlocking mechanism separately;
   the unlocking mechanism being used for locking when the direct-current charging gun is in use, and for unlocking when the direct-current charging gun is not in use;
   the communication mechanism being configured to be in communication, when being triggered, with a charging device to interrupt a direct current in the charging gun; and
   the safety mechanism being configured not to trigger the communication mechanism in an unarmed state and to lock the unlocking mechanism, and triggering the communication mechanism for interrupting the direct current in the charging gun first and then unlocking the unlocking mechanism during arming,
   wherein when the safety mechanism is in a default state position, the communication mechanism is not triggered, and the unlocking mechanism is in a locked state; when the safety mechanism leaves the default state position, the communication mechanism is triggered; and when the safety mechanism is moved to a first state position, the unlocking mechanism is unlocked and is operatable to achieve unlocking; and
   wherein the unlocking mechanism is a lever assembly, and the lever assembly comprises an unlocking lever and a first lever rotating shaft, the first lever rotating shaft being disposed at a middle portion of the unlocking lever, and a snap-fit fastener being disposed on one side of the unlocking lever;
   the safety mechanism comprises a pressing rod and a reset assembly, the upper end of the pressing rod being slidably sleeved on the side of the unlocking lever away from the snap-fit fastener, and the reset assembly comprises a reset lever, a second lever rotating shaft and a stop member, the second lever rotating shaft being disposed at a middle portion of the reset lever, the lower end of the pressing rod abutting against one end of the reset lever, and the stop member being fixedly disposed and abutting against the end of the reset lever away from the pressing rod; and
   the communication mechanism comprises a first signal contact and a second signal contact, the first signal contact being fixedly disposed on the pressing rod, the second signal contact being in communicative connection with the charging device, and the first signal contact and the second signal contact being not triggered when abutting and being triggered when being separated.

2. The direct-current charging gun according to claim 1, wherein the lever assembly further comprises a first elastic member, one end of the first elastic member being fixedly disposed, and the other end of the first elastic member being connected to the unlocking lever and being disposed between the first lever rotating shaft and the pressing rod; and/or
   the reset assembly further comprises a second elastic member, one end of the second elastic member being fixedly disposed in a sliding direction of the pressing rod, and the other end of the second elastic member being connected to the pressing rod.

3. The direct-current charging gun according to claim 1, wherein the reset assembly further comprises third elastic members, one end of each of the two third elastic members being fixedly disposed, the other end of each of the two third elastic members being connected to the reset lever, and the second lever rotating shaft being disposed between the two third elastic members.

4. The direct-current charging gun according to claim 1, wherein the reset lever is provided with a bearing member, and the bearing member is disposed on the side close to the pressing rod, and/or the reset lever is provided with a friction patch, and/or the reset lever is provided with an arc-shaped groove, and the lower end of the pressing rod is provided with an arc-shaped protrusion mating with the arc-shaped groove.

5. The direct-current charging gun according to claim 1, wherein the direction of movement of the safety mechanism for arming is different from the direction of movement of the unlocking mechanism for unlocking.

6. A direct-current charging gun, comprising an unlocking mechanism, a safety mechanism and a communication mechanism, the safety mechanism being connected to the communication mechanism and the unlocking mechanism separately;
- the unlocking mechanism being used for locking when the direct-current charging gun is in use, and for unlocking when the direct-current charging gun is not in use;
- the communication mechanism being configured to be in communication, when being triggered, with a charging device to interrupt a direct current in the charging gun; and
- the safety mechanism being configured not to trigger the communication mechanism in an unarmed state and to lock the unlocking mechanism, and triggering the communication mechanism for interrupting the direct current in the charging gun first and then unlocking the unlocking mechanism during arming,
- wherein when the safety mechanism is in a default state position, the communication mechanism is not triggered, and the unlocking mechanism is in a locked state; when the safety mechanism leaves the default state position, the communication mechanism is triggered; and when the safety mechanism is moved to a first state position, the unlocking mechanism is unlocked and is operatable to achieve unlocking; and
- wherein the unlocking mechanism is a lever assembly, and the lever assembly comprises an unlocking lever and a first lever rotating shaft, the first lever rotating shaft being disposed at a middle portion of the unlocking lever, and a snap-fit fastener being disposed on one side of the unlocking lever;
- the safety mechanism comprises a pressing rod and a reset assembly, the upper end of the pressing rod being slidably sleeved on the side of the unlocking lever away from the snap-fit fastener; the reset assembly comprises an L-shaped fixing block and a fourth elastic member; the L-shaped fixing block comprises a vertical raised edge and a horizontal raised edge, the fourth elastic member being disposed on the horizontal raised edge, and the lower end of said pressing rod abutting against the top of the vertical raised edge; and
- the communication mechanism comprises a first signal contact and a second signal contact, the first signal contact being fixedly disposed on the pressing rod, the second signal contact being in communicative connection with the charging device, and the first signal contact and the second signal contact being not triggered when abutting and being triggered when being separated.

7. A direct-current charging gun, comprising an unlocking mechanism, a safety mechanism and a communication mechanism, the safety mechanism being connected to the communication mechanism and the unlocking mechanism separately;
- the unlocking mechanism being used for locking when the direct-current charging gun is in use, and for unlocking when the direct-current charging gun is not in use;
- the communication mechanism being configured to be in communication, when being triggered, with a charging device to interrupt a direct current in the charging gun; and
- the safety mechanism being configured not to trigger the communication mechanism in an unarmed state and to lock the unlocking mechanism, and triggering the communication mechanism for interrupting the direct current in the charging gun first and then unlocking the unlocking mechanism during arming,
- wherein when the safety mechanism is in a default state position, the communication mechanism is not triggered, and the unlocking mechanism is in a locked state; when the safety mechanism leaves the default state position, the communication mechanism is triggered; and when the safety mechanism is moved to a first state position, the unlocking mechanism is unlocked and is operatable to achieve unlocking; and
- wherein the unlocking mechanism comprises a sleeve and an unlocking mechanism body, one end of the unlocking mechanism body being provided with two retractable elastic snap-fit fasteners that splay outward, and the sleeve being slidably disposed on the other end of the unlocking mechanism body;
- the safety mechanism comprises a pressing bar and a limiting member, the pressing bar being provided with a hollow columnar boss, the limiting member being provided with a limiting channel therein, and two ends of the hollow columnar boss abutting against the limiting channel; and
- the communication mechanism comprises a first signal contact and a second signal contact, the first signal contact being fixedly disposed on the pressing bar, the second signal contact being in communicative connection with the charging device, and the first signal contact and the second signal contact being not triggered when abutting and being triggered when being separated.

* * * * *